United States Patent [19]
Burgett et al.

[11] 3,828,254
[45] Aug. 6, 1974

[54] MAGNETIC GAUGE CIRCUIT

[75] Inventors: James F. Burgett, Garden City, Mich.; Lawrence J. Vanderberg, Hendersonville, N.C.

[73] Assignee: Ford Motor Company, Dearborn, Mich.

[22] Filed: Aug. 6, 1973

[21] Appl. No.: 386,268

[52] U.S. Cl................ 324/101, 324/132, 324/144, 340/177
[51] Int. Cl....................... G01r 17/10, G01r 11/30
[58] Field of Search........... 324/101, 132, 131, 143, 324/144, 146, 147; 340/177 R

[56] References Cited
UNITED STATES PATENTS

| | | | |
|---|---|---|---|
| 2,288,399 | 6/1942 | Hoare et al. | 324/132 X |
| 2,443,073 | 6/1948 | Knudsen | 324/101 X |
| 3,636,447 | 1/1972 | Gelenius | 324/146 X |

Primary Examiner—Alfred E. Smith
Attorney, Agent, or Firm—Robert W. Brown; Keith L. Zerschling

[57] ABSTRACT

An electrical bridge magnetic gauge circuit includes a magnetic gauge having at least two coils for producing magnetic fluxes and having movable indicating means responsive to the vector resultant of the magnetic fluxes. The gauge coils are connected in a four-terminal bridge circuit. One of the coils is connected across opposite terminals of the bridge circuit, and the other coil is connected between adjacent bridge terminals. A variable resistance, responsive to a variable parameter to be indicated by the movable indicating means of the gauge, is also connected between adjacent bridge terminals. Changes in the variable resistance causes an increase in the current in one of the gauge coils and a simultaneous decrease in the current in the other gauge coil. Preferably, the current in one of the gauge coils reverses in direction as the variable resistance is varied between its minimum and maximum values.

7 Claims, 2 Drawing Figures

| Current (ma) | Resistance $R_7$ (ohms) | | |
|---|---|---|---|
| | 73 | 41.6 | 10 |
| $I_1$ | 167 | 170 | 206 |
| $I_2$ | 182 | 170 | 124 |
| $I_3$ | -19 | 0 | 82 |
| $I_4$ | 78 | 85.2 | 117 |
| $I_5$ | 59 | 85.2 | 199 |

PATENTED AUG 6 1974

3,828,254

MAGNETIC GAUGE CIRCUIT

BACKGROUND OF THE INVENTION

This invention relates to a magnetic gauge circuit particularly suitable for use in a motor vehicle or the like.

Magnetic gauges of the type having a movable indicator attached to a rotatably journalled, permanent magnet are well known in the art. Such magnetic gauges typically include two or more electrical coils. The coils are positioned such that one of them produces a magnetic flux having a first direction and the other produces a magnetic flux having a second direction. When current flows through the coils, the permanent magnet aligns itself with the vector resultant of the magnetic flux fields produced by the electrical coils and, of course, the movable indicator attached to the permanent magnet provides an indication of this vector resultant. If a given parameter is to be measured, it is used to vary the current in one or more of the coils. This changes the vector resultant of the magnetic fluxes produced by the coils. The position of the movable indicator changes when the permanent magnet rotates so that its poles are in alignment with the new vector resultant of the magnetic fluxes. Typically, a variable resistance is used to produce a change in current in at least one of the gauge coils in response to variation of the parameter to be measured.

SUMMARY OF THE INVENTION

It is an object of the present invention to provide a magnetic gauge circuit suitable for use with a magnetic gauge having only two coils, although a greater number of gauge coils may also be used.

Another object of the invention is to provide a magnetic gauge circuit using two gauge coils and a variable resistance wherein a variation of the resistance causes the current in one of the coils to increase while the current in the other coil decreases.

Another object of the invention is to provide a circuit for a magnetic gauge having at least two electrical coils wherein the current in one of the coils reverses in direction as a variable resistance is varied between its minimum and maximum values.

A further object of the invention is to provide a magnetic gauge circuit using at least two coils connected in a four-terminal bridge circuit.

A still further object of the invention is to provide an electrical bridge magnetic gauge circuit utilizing at least two gauge coils having equal resistance values.

In the preferred form of the invention, these and other objects are attained in an electrical bridge magnetic gauge circuit which includes a DC source of electrical energy and a magnetic gauge having first and second electrical coils and a movable indicator responsive to magnetic fluxes produced by current in the gauge coils. The gauge coils produce magnetic fluxes having first and second directions and the movable indicator is responsive to the vector resultant of these magnetic fluxes. The magnetic gauge coils are connected in a bridge circuit having first, second, third and fourth terminals. The first and third terminals are coupled to the DC source of electrical energy, and one of the gauge coils is connected between the second and fourth bridge terminals which are located opposite one another. An electrical resistance is connected between the first and second bridge terminals, and a second electrical resistance is connected in series with the other gauge coil, this series-connected combination being connected between the second and third terminals of the electrical bridge circuit. A third electrical resistance is connected between the third and fourth bridge terminals, and a fourth electrical resistance is connected between the first and fourth bridge terminals.

One of the electrical resistances is variable and its variation simultaneously causes the current in one of the coils to increase and the current in the other of the coils to decrease thereby to cause movement of the movable indicator of the magnetic gauge. This movement, of course, results from changes in the magnetic fluxes produced by the changing currents in the gauge coils. Also, the circuit values may be chosen such that variation of the variable resistor causes the current in one of the coils to reverse in direction. This reverses the direction of the magnetic flux produced by the coil and may be used to increase the range of angular movement of the gauge indicator.

The invention may be better understood by reference to the detailed description which follows and to the drawings.

DETAILED DESCRIPTION OF THE INVENTION

Figure 1:
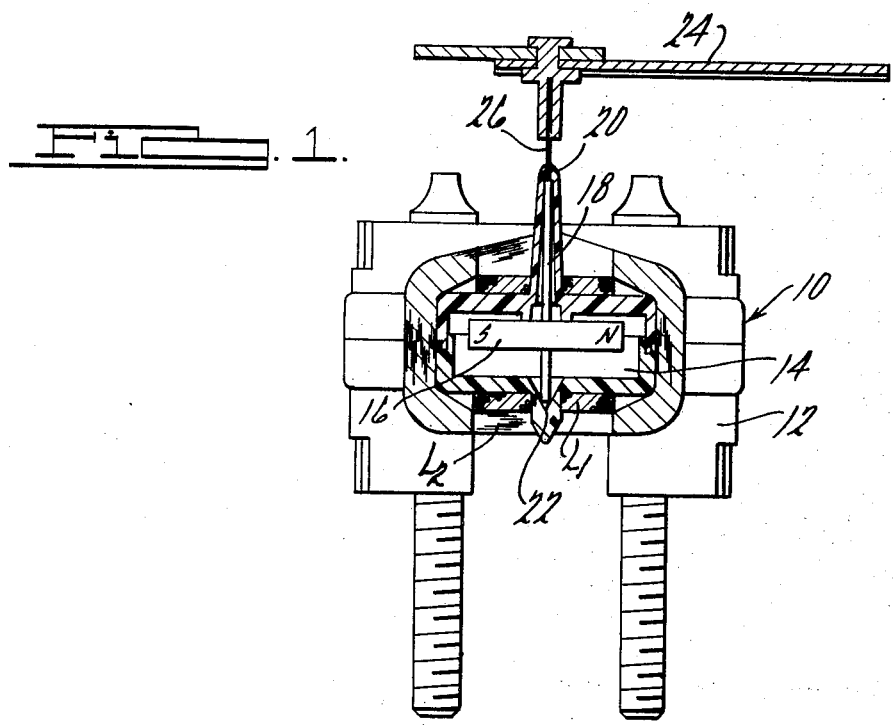
FIG. 1 is a sectional view of a two-coil magnetic gauge which uses a permanent magnet to produce motion of an indicator in response to the vector resultant of magnetic fluxes produced by current in the gauge coils.

With reference to the drawings, wherein like component designations refer to like parts in the two figures, there is shown in FIG. 1 a magnetic gauge 10 suitable for use in the magnetic gauge circuit of the invention. The magnetic gauge 10 includes a housing 12, preferably made of a plastic material. The housing 12 is formed from two mating parts and has a chamber 14 in its central region in which a permanent magnet 16, havinb a north pole N and a south pole S, is located. The permanent magnet 16 is disc-shaped and is mounted for rotation on a shaft 18. The shaft 18 is journalled for rotation at locations 20 and 22. A counter-balanced indicator 24 is attached to a reduced-diameter portion 26 of the shaft 18 and rotates with the shaft.

The housing 12 forms a bobbin about which two coils $L_1$ and $L_2$ are wound. The coil $L_1$ is centrally positioned with respect to the shaft 18 and surrounds the chamber 14 in which the permanent magnet 16 is located. The other coil $L_2$ is also wound about the chamber 14 but its axis is positioned at an angle of 90° with respect to the axis of the coil $L_1$. Thus, the magnetic fluxes produced by the coils $L_1$ and $L_2$ when currents flow through them are generally directed along their respective axes and thus are perpendicular to one another. A magnetic gauge having coils the axes of which are not perpendicular to one another could also be used. For example, a two-coil magnetic gauge constructed in accordance with the teachings contained in U.S. patent application Ser. No. 265,027, the disclosure of which is incorporated herein by reference, filed June 21, 1972 in the names of James F. Burgett, G. A. Gorrell, Norman D. Mills and Lawrence J. Vanderberg and entitled "Magnetic Gauge with Two V-Positioned Coils" could be used. For purposes of the present invention, it need only be understood that the permanent magnet 16 rotates the shaft 18 and indicator 24 in response to changes in the magnetic fluxes produced by currents in the coils $L_1$ and $L_2$, the permanent magnet 16 rotating so that its poles are in alignment with the vector resultant of these magnetic fluxes.

Figure 2:
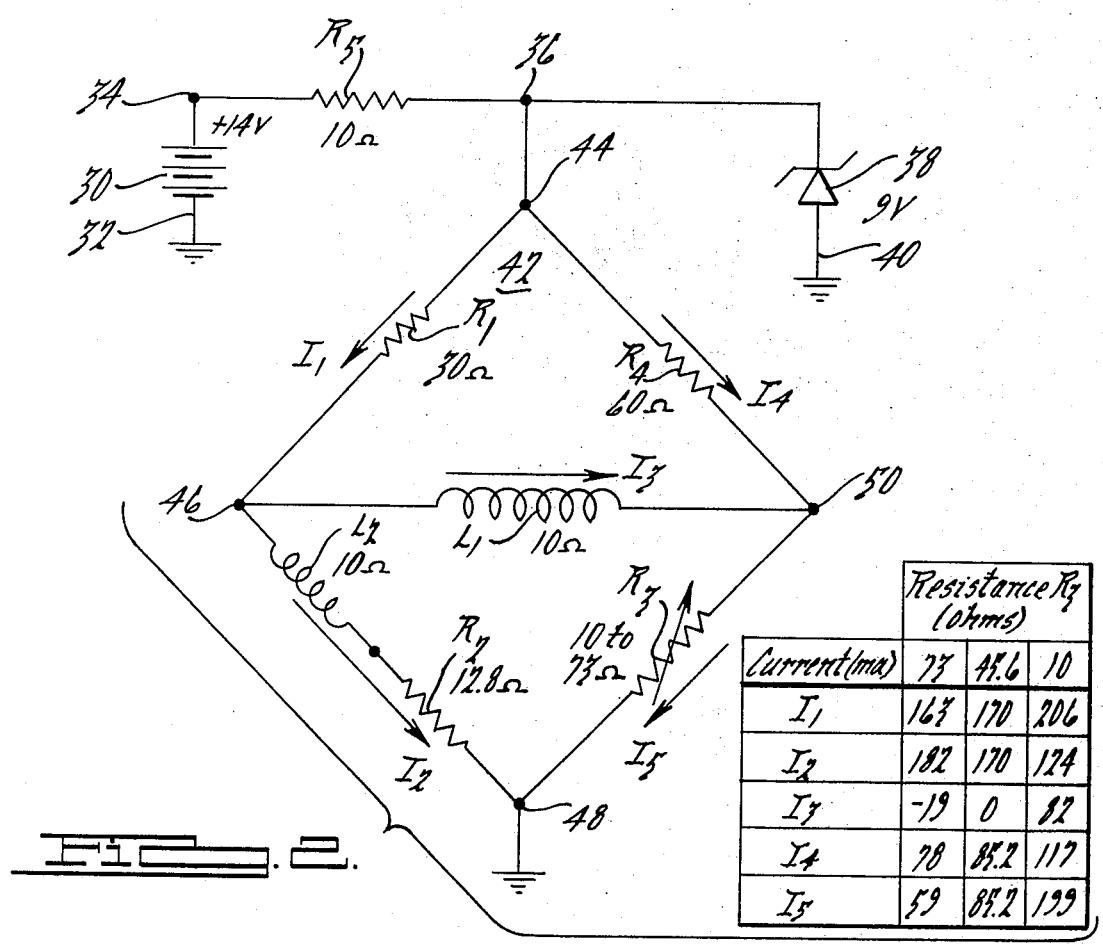
FIG. 2 is a schematic electrical diagram of an electrical bridge magnetic gauge circuit.

With particular reference now to FIG. 2, there is shown a magnetic gauge circuit. This circuit includes a DC source of electrical energy 30, which may be a conventional storage battery for a motor vehicle having nominal output voltage during vehicle operation of 14 volts. The negative terminal of the DC source of electrical energy 30 is connected at 32 to ground and its positive terminal is connected at a junction 34 to one terminal of a resistor $R_5$. The other terminal of the resistor $R_5$ is connected at a junction 36 to the cathode of a zener diode 38 the anode of which is connected to ground at 40. A four-terminal bridge circuit, generally designated by the numeral 42, has a first terminal 44 that is connected to the junction 36, a second terminal 46, a third terminal 48 connected to ground and a fourth terminal 50.

The coil $L_1$ of the magnetic gauge 10 is connected between the opposite terminals 46 and 50 of the bridge circuit 42. A first resistance $R_1$ is connected between the first bridge terminal 44 and the second bridge terminal 46. The coil $L_2$ of the magnetic gauge 10 is connected in series with a second resistance $R_2$, and the series combination of the coil $L_2$ and the resistance $R_2$ is connected between the second bridge terminal 46 and the third terminal 48. A variable resistance $r_3$, which varies in response to a parameter to be measured, is connected between the third bridge terminal 48 and the fourth bridge terminal 50. A resistance $R_4$ is connected between the first bridge terminal 44 and its fourth terminal 50. Preferably, the resistance $R_1$ is 30 ohms, $R_2$ is 12.8 ohms, $R_3$ is variable from a minimum of 10 ohms to a maximum of 73 ohms, the resistance $R_4$ is 60 ohms and the resistance $R_5$ is 10 ohms. Also, the coils $L_1$ and $L_2$ preferably have equal resistances of 10 ohms each. The zener diode 38 preferably has a breakdown voltage of 9 volts to supply this regulated voltage to the junction 36 and, thus, the first terminal 44 of the electrical bridge circuit 42.

The current through the resistance $R_1$ is designated by the letter $I_1$ and its conventional directional is indicated by the adjacent arrow. Similarly, $I_2$ indicates the current through the series-connected coil $L_2$ and resistance $R_2$, $I_3$ indicates the current through the coil $L_1$, $I_4$ indicates the current through the resistance $R_4$, and $I_5$ indicates the current through the variable resistance $R_3$.

Adjacent FIG. 2 of the drawings, there is a table of values for the currents $I_1$, $I_2$, $I_3$, $I_4$ and $I_5$ for three values of the resistance $R_3$ in the circuit. The table of values is applicable to the circuit of FIG. 2 wherein the voltage at the first terminal 44 is 9 volts and the bridge circuit electrical resistances and coils have the values indicated in FIG. 2.

From the table, it may be seen that when the resistance $R_3$ is 73 ohms, the current $I_1$ is 163 ma, $I_2$ is 182 ma, $I_3$ is −19 ma, the negative sign indicating that the current is in a direction oppostie to that indicated by the arrow adjacent the $I_3$ designation in FIG. 2, the current $I_4$ is 78 ma, and the current $I_5$ is 59 ma. The currents $I_2$ and $I_3$ are of particular importance because these are the currents through the coils $L_2$ and $L_1$, respectively, of the magnetic gauge. From the table, it may be seen that when the resistance $R_3$ is 45.6 ohms, a condition in which the bridge circuit 42 is balanced, the current $I_2$ will have decreased to 170 ma whereas the current $I_3$ through the coil $L_1$ will have become zero ma. When the resistance $R_3$ is 10 ohms, its minimum resistance, then the current $I_2$ through the coil $L_2$ will have decreased to 124 ma and the current $I_3$ through the coil $L_1$ will have reversed direction and attained a value of 82 ma, the direction of this current being that indicated by the arrow adjacent its designation in FIG. 2. Thus, it may be seen that as the current $I_2$ through the coil $L_2$ decreases, the current $I_3$ through the coil $L_1$ gradually changes from a −19 ma to zero ma and then reverses direction and increases in value to 82 ma at the minimum resistance setting of the variable resistance $R_3$. As these currents $I_2$ and $I_3$ change relative to one another, the permanent magnet 16 rotates to align its magnetic poles with the vector resultant of the magnetic fluxes produced by the currents in the coils $L_1$ and $L_2$.

Based upon the foregoing description of the invention, what is claimed is:

1. A magnetic gauge bridge circuit, which comprises: a magnetic gauge having first and second coils and movable indicating means responsive to magnetic fluxes produced by currents in said coils, said first coil being positioned to produce a magnetic flux having a first direction, said second coil being positioned to produce a magnetic flux having a second direction, said movable means being responsive to the vector resultant of said magnetic fluxes; and a bridge circuit having four terminals, said first gauge coil being connected across two opposite terminals of said bridge circuit, said second gauge coil being connected between one of said two opposite terminals and a bridge terminal adjacent said one of said two opposite terminals, said bridge circuit including electrical resistances connected between its other terminals, one of said electrical resistances being variable, the variation of said variable resistance causing a change in the currents in said gauge coils when said magnetic gauge bridge circuit is coupled to a source of electrical energy.

2. A magnetic gauge bridge circuit in accordance with claim 1, which further includes an electrical resistance connected in series with said second gauge coil.

3. A magnetic gauge bridge circuit in accordance with claim 1, wherein the electrical resistances of said first and second gauge coils are equal.

4. A magnetic gauge bridge circuit in accordance with claim 1, wherein, when said magnetic gauge bridge circuit is coupled to a DC source of electrical energy, the variation of said variable electrical resistance between its minimum and maximum values causes a reversal in the direction of the current in said first gauge coil.

5. A magnetic gauge circuit, which comprises: a DC source of electrical energy; a magnetic gauge having first and second electrical coils and movable indicating means responsive to magnetic fluxes produced by current in said gauge coils, said first and second coils being positioned such that their axes are at an angle with respect to one another, said movable means being responsive to the vector resultant of the magnetic fluxes produced by said first and second coils; and a bridge circuit having first, second, third and fourth terminals, said first and third terminals being coupled to said source of electrical energy, said first gauge coil being connected between said second and fourth terminals, said bridge circuit including a first electrical resistance connected between said first and second terminals, a second electrical resistance connected in series with said second gauge coil, said series-connected second electrical resistance and second gauge coil being connected between said second and third bridge terminals, a third electrical resistance connected between said third and fourth bridge terminals, and a fourth electrical resistance connected between said first and fourth bridge terminals, one of said electrical resistances being variable, variation of said variable electrical resistance simultaneously causing the current in one of said gauge coils to increase and the current in the other of said gauge coils to decrease, whereby, said movable indicating means changes position in response to changes in the magnetic fluxes produced by said gauge coils.

6. A magnetic gauge circuit in accordance with claim 5, wherein the current in said first gauge coil reverses in direction as said variable resistance is varied between its minimum and maximum values.

7. A magnetic gauge circuit, which comprises: a magnetic gauge having at least two coils for producing magnetic fluxes the respective directions of which are an angle with respect to one another, said magnetic gauge having movable means responsive to the vector resultant of said magnetic fluxes; and circuit means for causing current in one of said gauge coils to reverse in direction, said circuit means including a bridge circuit having four terminals, said one gauge coil being connected between opposite terminals of said bridge circuit, the other of said gauge coils being connected between adjacent bridge terminals, and a variable electrical resistance connected between adjacent bridge terminals, said reversal in current direction in said one gauge coil occurring when said magnetic gauge circuit is connected to a DC source of electrical energy and said variable resistance is varied.

* * * * *